United States Patent [19]
Clark

[11] Patent Number: 5,183,102
[45] Date of Patent: Feb. 2, 1993

[54] HEATING AND COOLING SYSTEM

[75] Inventor: Steven J. Clark, Belgrade, Mont.

[73] Assignee: The Montana Power Company, Butte, Mont. ; a part interest

[21] Appl. No.: 792,863

[22] Filed: Nov. 15, 1991

[51] Int. Cl.⁵ .................... F25B 29/00; F24F 3/08; A62C 35/58

[52] U.S. Cl. .................... 165/48.1; 165/50; 169/16

[58] Field of Search .............. 165/48.1, 50; 169/5, 169/16

[56] References Cited

U.S. PATENT DOCUMENTS

| | | | |
|---|---|---|---|
| 3,127,929 | 4/1964 | Ringquist | 165/50 |
| 3,170,508 | 2/1965 | Avery | 165/50 |
| 3,171,471 | 3/1965 | Blum | 165/50 |
| 3,181,604 | 5/1965 | Kritzer | 165/50 |
| 3,241,602 | 3/1966 | Andreassen | 165/50 |
| 3,366,164 | 1/1968 | Newton | 165/50 |
| 3,590,910 | 7/1971 | Lorenz | 165/48.1 |
| 4,019,581 | 4/1977 | Diggs | 169/16 |
| 4,132,263 | 1/1979 | Stinnett | 165/48.1 |
| 4,286,667 | 9/1981 | Westenhofer et al. | 169/16 |
| 4,375,831 | 3/1983 | Downing, Jr. | 165/48.1 |

FOREIGN PATENT DOCUMENTS

| | | | |
|---|---|---|---|
| 827855 | 12/1951 | Fed. Rep. of Germany | 165/50 |
| 29630 | 2/1986 | Japan | 165/48.1 |

Primary Examiner—John Rivell
Assistant Examiner—L. R. Leo
Attorney, Agent, or Firm—Christensen, O'Connor, Johnson & Kindness

[57] ABSTRACT

A system for heating and cooling a building is disclosed. A watercooler and a cold-water pump continuously circulates cold water through a fire sprinkler piping system. A waterheater and a hot-water pump circulates hot water through a domestic hot-water piping system. A plurality of fan-coil assemblies located throughout the building may access either the cold water flowing in the fire sprinkler piping system or the hot-water in the domestic hot-water piping system. The fan-coil assemblies include a fan and a coil. Depending upon whether hot water or cold water is flowing through the coil, air circulated by said fan may be heated or cooled for climate control.

22 Claims, 3 Drawing Sheets

HEATING AND COOLING SYSTEM

TECHNICAL AREA OF THE INVENTION

The present invention relates to heating and cooling systems for buildings and, more particularly, to a heating and cooling system that utilizes the fire sprinkler piping system and the domestic hot-water piping system to provide the heating and cooling liquids to the system.

BACKGROUND OF THE INVENTION

Traditionally, room-by-room heating, and air conditioning systems in large buildings have been what are known in the art as four-pipe fan-coil systems. The four-pipe fan-coil system consists of a separate cooling plant and a separate heating plant. The cooling plant supplies cold water through a first dedicated piping system that circulates the cold water throughout the building. Similarly, the heating plant supplies hot water through a separate second dedicated piping system for circulation throughtout the building. Individual fan-coil units placed at various locations throughout the building provide for zonal temperature control. Heating or cooling is provided by having the fan circulate air over a coil that is accessing either the hot-water or the cold-water piping system, respectively. While the four-pipe fan-coil system provides zonal temperature control, economy of operation, low maintenance, and minimum noise, the relatively high cost of constructing the dedicated hot and cold-water piping systems reduces their popularity.

To avoid the high cost of the four-pipe fan-coil systems, one prior art fan-coil system utilizes a single dedicated cooling/heating piping system. The single piping system may either carry heating water or cooling water. One disadvantage of the system is that the entire building must be either heated or cooled. While in some applications this restriction is acceptable, it can be appreciated that, in large buildings, portions of the building may require cooling while other portions of the building require heating.

A combination air conditioning and fire suppression system is shown in U.S. Pat. No. 3,939,914 to Carroll. A cooling plant and a heating plant are connected to a single piping system. The piping system is also used for fire suppression purposes. However, because only a single piping system is utilized, the water flowing therein must be a single temperature. Thus, in order to selectively heat and cool different zones of the building, a plurality of compressor-type heat exchangers must be located throughout the building. The use of the compressor-type heat exchangers allows heating or cooling from a single-temperature fluid. However, compressor-type heat exchangers are costly, require high-maintenance, and are relatively noisy.

The present invention solves these problems and others by utilizing separate heating and cooling piping systems. The cooling piping system is shared with the fire sprinkler piping system in the case of cold water and, in the case of hot water, the heating piping system is shared with the domestic hot-water piping system. By having two separate piping systems, specific zonal control of temperature can be achieved by the use of simple fan-coils. Moreover, because the piping systems are coincident with existing building systems, it can be appreciated that the cost of installing such a heating and cooling system is relatively low.

SUMMARY OF THE INVENTION

A low-cost heating and cooling system allowing zonal temperature control is disclosed. A watercooler is integrated into the fire sprinkler piping system of a building. The watercooler along with a cold-water pump circulates cold water throughout the fire sprinkler piping system. In addition, water circulating in the domestic hot-water piping system is accessed for heating purposes. A plurality of fan-coil units are located throughout the building. Each fan-coil unit includes a hot-water tap and a cold-water tap that can access water circulating in the domestic hot-water piping system and fire sprinkler piping system, respectively. Zonal temperature control is realized by having each fan-coil selectively access hot water or cold water. The fan-coil circulates air over a coil accessing the water and heating or cooling may be effectuated.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
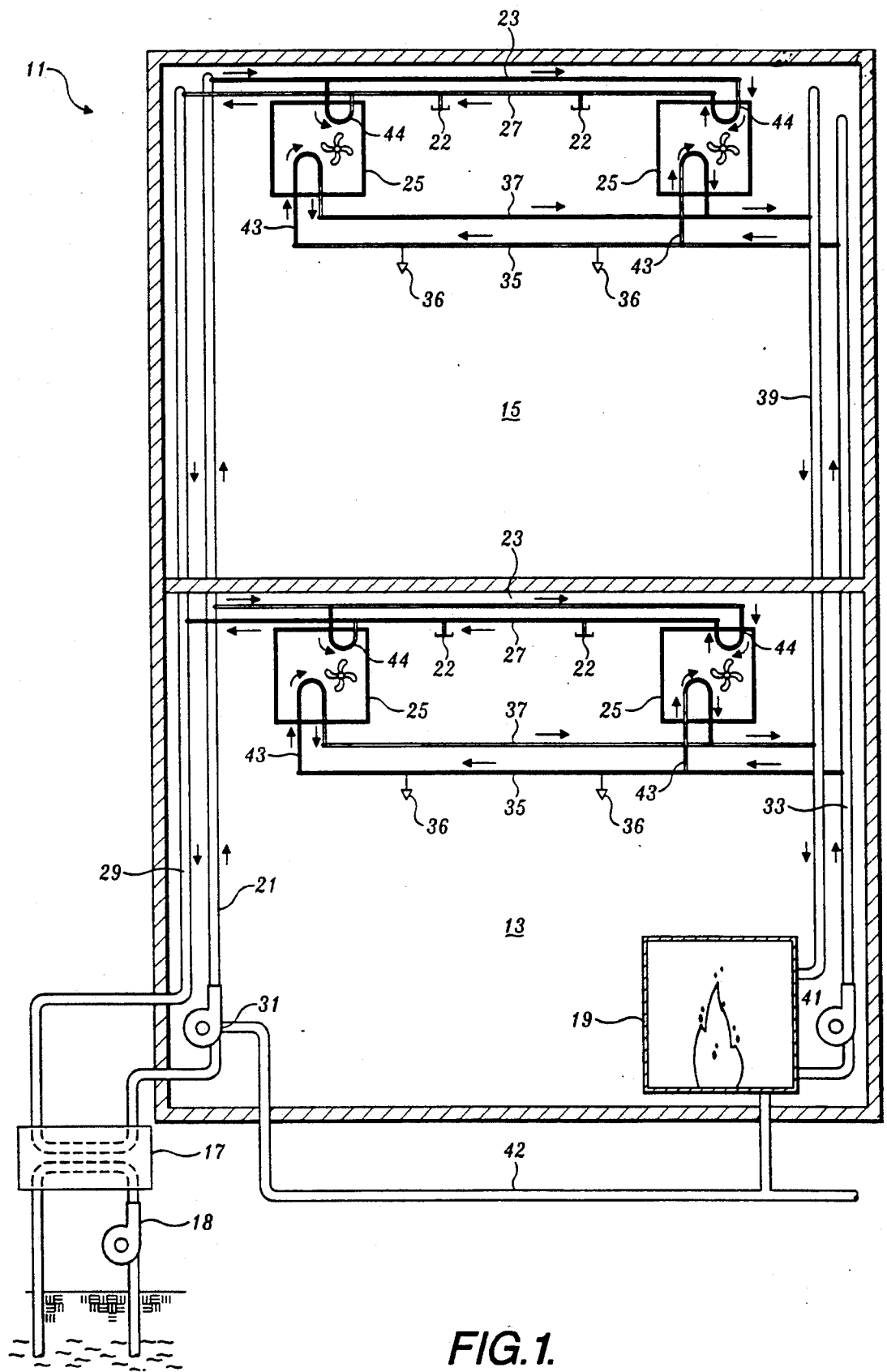
FIG. 1 is a schematic view of two stories of a multi-story building incorporating the present invention.

Referring to FIG. 1, a portion of a multi-story building is generally shown by reference numeral 11. The portion of the building shown includes a ground story 13 and a second story 15. As is typical for most commercial multi-story buildings, a fire sprinkler piping system is integrated therein. In FIG. 1, the fire sprinkler piping system is generally comprised of a cold-water supply riser 21, a cold-water return riser 29, a plurality of cold-water supply branches 23, a plurality of cold-water return branches 27, and a plurality of release valves 22.

The fire sprinkler piping system described herein provides a continuously circulating water supply. Specifically, still referring to FIG. 1, a watercooler 17 is integrated into the fire sprinkler piping system. In the illustrated embodiment, the watercooler 17 is a heat exchanger that utilizes ground water accessed via a well in order to cool the water in the fire sprinkler piping system. In operation, a pump 18 circulates ground water into the watercooler 17 via a separate independent piping network. Also circulating within watercooler 17 is the water in the fire sprinkler piping system. By known thermodynamic processes, the water in the fire sprinkler piping system is cooled to nearly the temperature of the ground water. Although described above is one type of watercooler, it can be appreciated by those skilled in the art that other methods of cooling the water in the fire sprinkler piping system may be utilized, such as a mechanical cooler or a thermal storage device.

Circulation of the cold water in the fire sprinkler piping system is maintained by a cold-water pump 31.

The cold-water pump 31 is integral with cold-water supply riser 21 and acts to circulate cold water vertically up the cold-water supply riser 21. Distribution of water to each story is accomplished by the cold-water supply branches 23 that generally run laterally from the cold-water supply riser 21. For simplicity, only one cold-water supply branch is shown for each story; however, it can be appreciated that a plurality of cold-water branches may be utilized. In communication with the terminal end of each cold-water supply branch 23 is a cold-water return branch 27 that returns the water to the cold-water return riser 29. The cold-water return riser 29 returns the water back to watercooler 17 where the water is cooled and returned back into cold-water supply riser 21. In sum, water is circulated from the watercooler 17, up the cold-water supply riser 21, across the cold-water supply branches 23, returning across cold-water return branches 27, down cold-water return riser 29, and back to watercooler 17.

The risers 21 and 29 and the cold-water branches 23 and 27 are typically located in the interior walls of the building. The cold-water risers 21 and 29 are typically piping. Alternatively, the risers may be watertight structural columns of the building, which would provide the further advantage of saving additional construction costs. The cold-water branches 23 and 27 are, in the preferred embodiment, constructed of tubular piping. The release valves 22 are incorporated into the cold-water branches 23 and 27 and extend downwardly into the interior of each story such that emergency fire suppression may be accomplished. Although FIG. 1 shows two release valves 22 per story, it can be appreciated that more may be utilized. As is known in the art, release valves 22 allow water in the cold-water branches 23 and 27 to flow outward when a fire is detected, thereby suppressing the fire.

For simplicity, the fire sprinkler piping system has been described and shown as a closed loop system, whereby the same water is circulated continuously within the fire sprinkler piping system. However, it can be appreciated that an outside water source must be available for replenishing the water in the fire sprinkler piping system during fire suppression. For example, a municipal water main 42 is connected to cold-water pump 31 by means of a check valve mechanism. The cold-water pump 31 may then inject water from the municipal water main 42 into the fire sprinkler piping system when necessary.

Another piping system existing in nearly all buildings is the domestic hot-water piping system. The domestic hot-water piping system distributes hot water to various portions of the building for use by the occupants in, for example, restrooms and dining facilities. Still referring to FIG. 1, a domestic hot-water piping system includes a hot-water supply riser 33, a hot-water return riser 39, a plurality of hot-water supply branches 35, a plurality of hot-water return branches 37, and a plurality of hot-water outlets 36. The hot-water outlets 36 are outflow points in the domestic hot-water piping system and are typically faucets in a restroom or in a kitchen area. Although only two outlets 36 are shown for each story, it can be appreciated that many outlets may be utilized.

A waterheater 19 is integral to and supplies hot water to the domestic hot-water piping system. A hot-water pump 41 connected to hot-water supply riser 33 circulates hot water vertically up hot-water supply riser 33. The hot-water pump 41 also maintains water pressure in the hot-water piping system. From the hot-water supply riser 33, the hot water is distributed by laterally extending hot-water supply branches 35. For simplicity, only one supply branch 35 is shown for each story, however, it can be appreciated that multiple branches may be utilized. The terminal ends of the hot-water supply branches 35 are connected to the hot-water return branches 37. The hot-water return branches 37 feed into a hot-water return riser 39 that in turn feeds into waterheater 19. In sum, water is circulated up the hot-water supply riser 33, across the hot-water supply branches 35, returning back across hot-water return branches 37, down hot-water return riser 39, and back to waterheater 19.

Moreover, municipal water main 42 is also connected to the waterheater 19. As water in the domestic hot-water piping system is released via the hot-water outlets 36, the water is replenished using water from the municipal water main 42. A check valve mechanism may be utilized to connect the water main to the waterheater 19. Although one particular form of domestic hot-water piping system has been disclosed, it can be appreciated that many different configurations of domestic hot-water piping systems are possible and would be suitable for operation of the present invention.

The present invention utilizes both of the above-described piping systems to heat and cool the building. Located throughout the building are a plurality of fan-coil assemblies 25. The fan-coil assemblies 25 are the actual heating and cooling sources. Although FIG. 1 shows only two stories of a multi-story building with two fan-coil assemblies 25 for each story, it should be appreciated that the present invention is intended to be utilized for single-story and multi-story buildings of any number of stories and with any number of fan-coil assemblies located throughout each story.

Each fan-coil assembly 25 is associated with and connected to a cold-water tap 44 and a hot-water tap 43. The cold-water taps 44 serve to divert water from the cold-water supply branches 23 to their associated fan-coil assemblies 25. Similarly, the hot-water taps 43 divert hot water from the hot-water supply branches 35 to their associated fan-coil assemblies 25. In both instances, the diverted water is returned to the appropriate return branches 27 and 37, i.e. the cold-water tap 44 returns cold water to cold-water return branches 27 and the hot-water tap 43 returns hot water to the hot-water return branches 37. Both the hot-water taps 43 and cold-water taps 44 are typically tubular pipes that access the two piping systems by means of T-branches.

The diverted water is utilized by the fan-coil assemblies 25 for heating or cooling the interior of building 11. Moreover, by supplying both hot water and cold water to each fan-coil assembly, zonal temperature control can be obtained. For example, one fan-coil assembly 25 may be utilizing the water from the fire sprinkler piping system, ostensibly cold water, to cool one area of the building while at the same time another fan-coil assembly 25 may be utilizing water from the domestic hot-water piping system to heat another area of the building.

Figure 2:
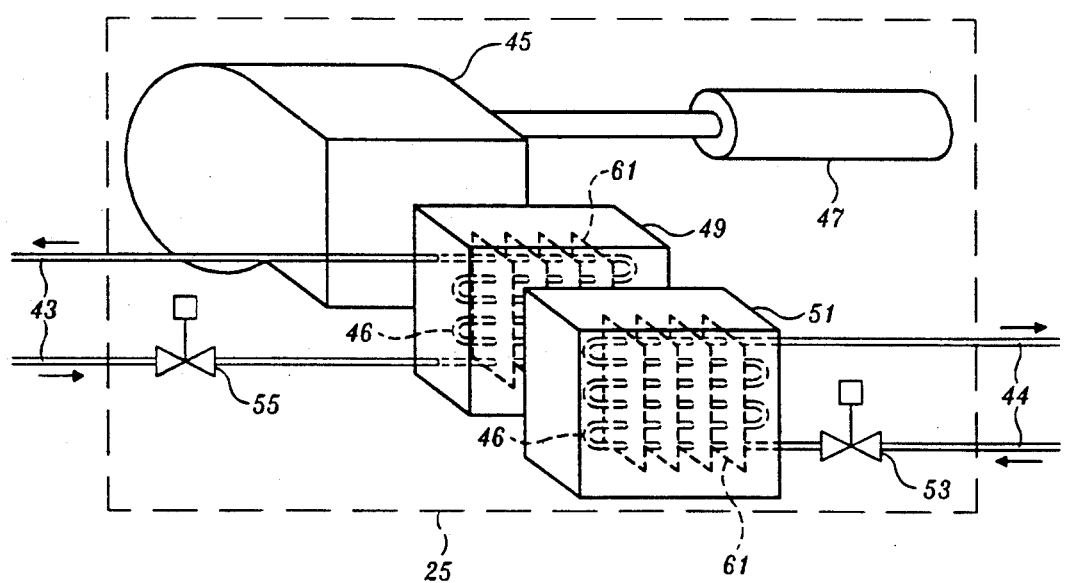
FIG. 2 is a schematic representation of one embodiment of a fan-coil suitable for use in the present invention.

Referring next to FIG. 2, a fan-coil 25 is shown in schematic form and comprises fan 45, fan motor 47, heating coil unit 49, cooling coil unit 51, cold-water valve 53, and hot-water valve 55. In addition, both the cooling coil unit 51 and the heating coil unit 49 includes radiating fins 61 and coil tubing 46. The fan-coil assembly 25 may be utilized to heat or cool an interior space of a building. If heating is desired, hot-water valve 55 is opened and water flows from hot-water supply branch 35 via hot-water tap 43 into the tubing 46 of heating coil unit 49. Fan motor 47 drives fan 45 such that air is circulated about the radiating fins 61 of heating coil unit 49. Heat is transferred through known thermodynamic processes via the radiating fins 61 from the hot water flowing through the tubing 46 to the circulating air. The water is returned from heating coil unit 49 through hot-water tap 43 to hot-water return branch 37 for final return to waterheater 19.

Similarly, if cooling is desired, cold-water valve 53 is opened to allow water from cold-water supply branch 23 via cold-water tap 44 to flow into the tubing 46 of cooling coil unit 51. Fan motor 47 drives fan 45 to circulate air about the radiating fins 61 of cooling coil unit 51. Heat is transferred via known thermodynamic processes from the air to the water. The water is returned by cold-water tap 44 out of the cooling coil unit 51 to cold-water return branch 27. The water is then returned to watercooler 17 via the cold-water return riser 29.

Control of hot-water valve 55 and cold-water valve 53 may be accomplished via electromechanical devices. In addition, valves 53 and 55 may be connected to a thermostat (not shown) that triggers opening and closing of each valve for either heating or cooling. It can be appreciated that, generally, when hot-water valve 55 is opened, cold-water valve 53 should be closed. Similarly, when cold-water valve 53 is opened, hot-water valve 55 should be closed.

Figure 3:
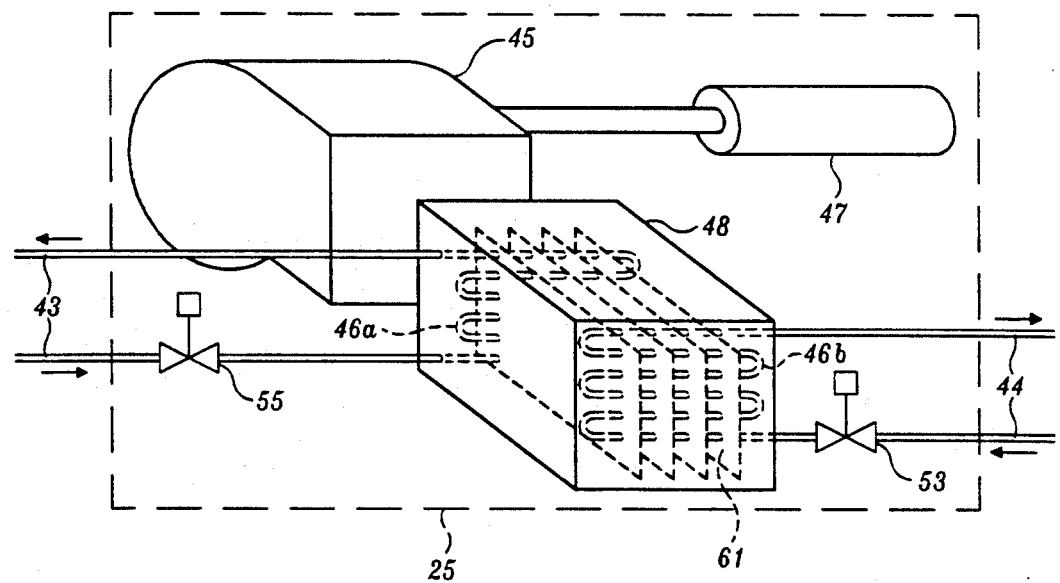
FIG. 3 shows another embodiment of a fan-coil suitable for use in the present invention.

As seen in FIG. 3, in an alternative embodiment of the fan-coil assembly 25, a single coil unit 48 includes radiating fins 61 and two sets of tubing 46a and 46b that carry the heating water and the cooling water, respectively. Thus, a common set of radiating fins 61 is shared for cooling and heating. The operation of the embodiment shown in FIG. 3 is similar to that of the embodiment shown in FIG. 2 except that the heating and cooling water flows into the tubing 46a and 46b of the single coil unit 48. Specifically, if heating is desired, hot-water valve 55 is opened and water flows from hot-water supply branch 35 via hot-water tap 43 into the hot water tubing 46a of coil unit 48. Fan motor 47 drives fan 45 such that air is circulated about the radiating fins 61 of coil unit 48. Heat is transferred through known thermodynamic processes from the hot water flowing through tubing 46a to the circulating air. The hot water in the tubing 46a is then returned through hot-water tap 43 to hot-water return branch 37 for final return to waterheater 19.

If cooling is desired, cold-water valve 53 is opened to allow water from cold-water supply branch 23 via cold-water tap 44 to flow into the cold water tubing 46b of coil unit 48. Fan motor 47 drives fan 45 to circulate air about the radiating fins 61. Heat is transferred via known thermodynamic processes from the air to the water. The water is returned by cold-water tap 44 out of the tubing 46b to cold-water return branch 27. The water is then returned to watercooler 17 via the cold-water return riser 29.

As can be appreciated by those skilled in the art, normally the use of a single coil having a single set of radiating fins is not practical. In a typical prior art four-pipe fan-coil system that has a dedicated cooling and heating piping system, the temperature of the heating water is approximately 180 degrees Fahrenheit. Thus, the coils that carry the heating water generally have a small radiating surface in order to prevent overheating. However, the use of a coil with a small radiating surface would be unsuitable for cooling, which generally requires a large radiating surface for efficient cooling of the surrounding air.

In contrast, the present invention utilizes the domestic hot water supply, that typically has a relatively low temperature of approximately 120 degrees Fahrenheit. Therefore the heating coil does not require a small radiating surface, and thus, the same coil may be utilized for both heating and cooling purposes. It can be appreciated that many significant advantages to utilizing a single coil for heating and cooling are realized. First, the cost of manufacturing each individual fan-coil unit is greatly reduced. Further, the use of a single coil reduces to weight and volume of each fan-coil. The reduced volume reduces the air pressure drop over the coils, allowing for increased efficiency in heat transfer and reduces fan energy consumption.

Figure 4:
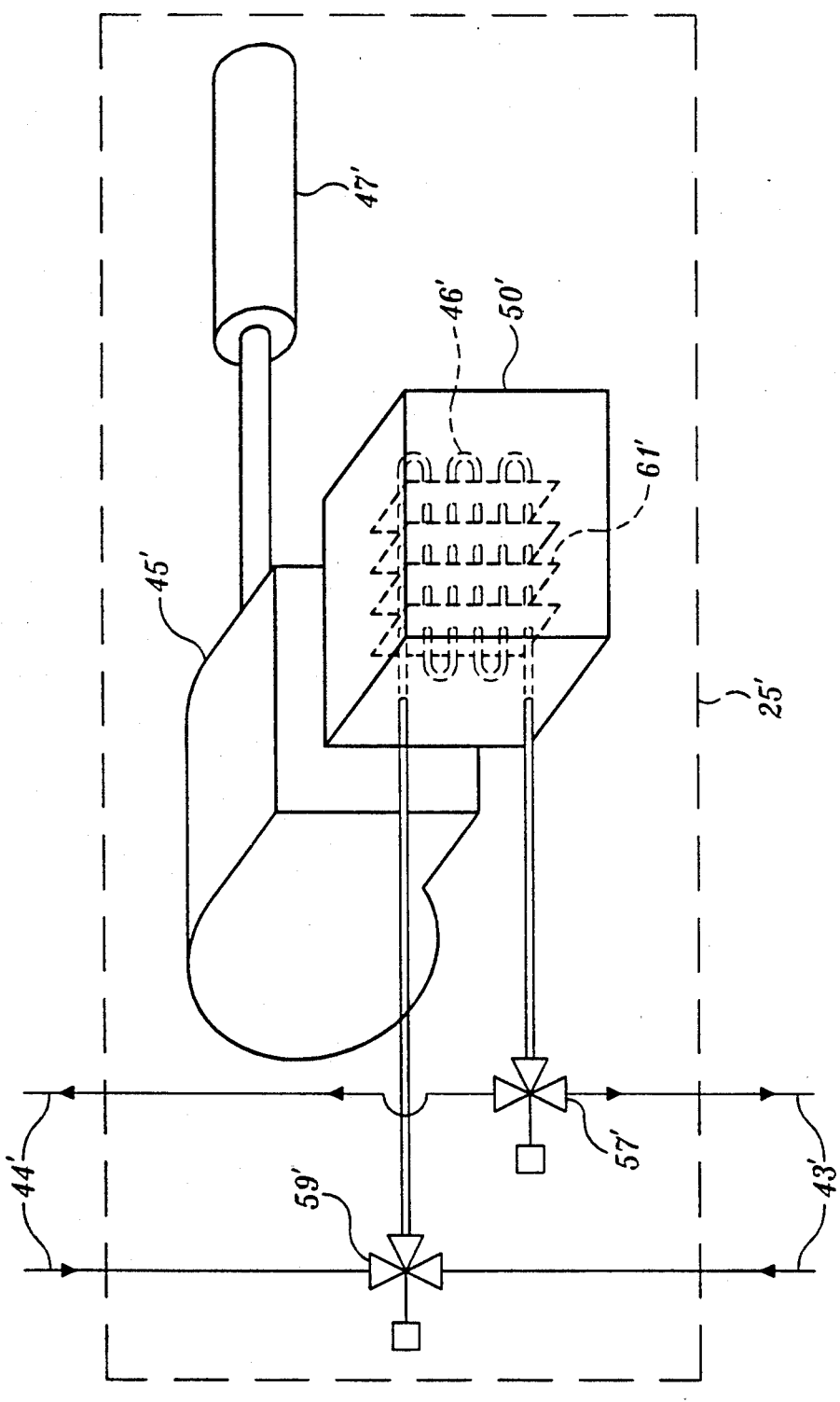
FIG. 4 shows yet another embodiment of a fan-coil suitable for use in the present invention.

In another alternative embodiment of the fan-coil assemblies 25, as seen in FIG. 4, a system of valves may be incorporated into the fan-coil assembly such that a single coil with a single set of tubing 46' is required for heating and cooling. The fan-coil assembly of FIG. 4 comprises fan 45', fan motor 47', coil 50', hot-water tap 43', cold-water tap 44', three-way return valve 57', and three-way supply valve 59'. The three-way supply valve 59' selectively allows water to flow from either the supply portion of hot-water tap 43' or the supply portion of cold-water tap 44' into the coil 50'. Similarly, three-way return valve 57' allows water to selectively flow from the coil 50' into either the return portion of hot-water tap 43' or the return portion of cold-water tap 44'. By suitably controlling the three-way valves 57' and 59', either hot water or cold water may be circulated through the coil 50'. Thus, in the same manner as fan-coil assembly 25 shown in FIGS. 2 and 3, fan motor 47' drives fan 45' to circulate air about coil 50'.

Depending upon whether cold water or hot water is circulated in coil 50', either heating and cooling can be effected. Once again, three-way valves 57' and 59' may be electronically controlled by known electromechanical devices. However, both valves must be coordinated in their switching such that if 59' allows hot water into coil 50', three-way return valve 57' must route the water to the return portion of hot-water tap 43'. This alternative embodiment utilizes a single coil 50' with a single tubing structure, thus reducing the manufacturing cost for each fan-coil assembly 25'.

As can be seen in the description above, zonal temperature control may be accomplished by utilizing a plurality of fan-coil assemblies. Moreover, in contrast to the prior art, the fan-coil assemblies 25 are relatively simple in manufacture as compared with compressor-type heat exchangers operating off of a single-temperature fluid. As can be appreciated by those skilled in the art, a single-temperature fluid heating and cooling system requires a complex heat exchanger including an evaporator and compressor in order to generate cooling or heating from a single-temperature fluid.

Additionally, the compressor type heat exchangers require large amounts of power and are relatively noisy. In contrast, the fan-coil assemblies 25 require only power to drive the fan. By having a hot-water supply and a cold-water supply to each fan-coil assembly, heating and cooling can be accomplished without the expense of having a plurality of evaporators and compressors. Moreover, by utilizing the fire-sprinkling system to carry the cold-water supply and the domestic hot-water piping system to carry the hot-water supply, additional savings are realized. Specifically, initial building costs are greatly reduced by eliminating the need for dedicated piping systems. Further, the additional energy costs of pumping and heating a dedicated system, along with replacing the heat loss through a separate piping system, are avoided. While a preferred embodiment of the invention has been illustrated and described, it will be appreciated that various changes can be made therein without departing from the spirit and scope of the invention. Consequently, within the scope of the appended claims, it is to be understood that the invention can be practiced otherwise than as specifically described herein.

The embodiments of the invention in which an exclusive property or privilege is claimed are defined as follows:

1. A system for heating and cooling a building, said building having a first piping system that forms a fire sprinkler piping system and a second piping system forming a domestic hot-water piping system, said system for heating and cooling comprising:

water-cooling means for supplying and maintaining water in said first piping system at a first temperature;

domestic water-heating means for supplying water to said second piping system and for exclusively maintaining water in said second piping system at a second temperature; and a plurality of fan-coil assemblies located throughout said building, said fan-coil assemblies able to access said water at said first temperature from said first piping system and also able to access said water at said second temperature from said second piping system, wherein each of said fan-coil assemblies includes air-circulating means and a first coil, said fan-coil assembly circulating air about said first coil, thereby transferring heat from the water in said first coil to the air if said first coil is accessing said water at said second temperature, and transferring heat from the air to the water in said first coil if said first coil is accessing said water at said first temperature.

2. The system of claim 1, wherein said fan coil assemblies include a first tubing network for carrying said water at said first temperature, a second tubing network for carrying said water at said second temperature, and a set of radiating fins, whereby both said first tubing network and said second tubing network are connected to said set of radiating fins such that thermal transfer may occur.

3. The system of claim 2, wherein said fan-coil assemblies further include valve means for controlling the flow of water to said first tubing network and said second tubing network.

4. The system of claim 1, wherein said fan-coil assemblies further include a second coil, wherein said second coil can exclusively access said water at said second temperature and said first coil can exclusively access said water at said first temperature.

5. The system of claim 4, wherein said fan-coil assemblies further include valve means for controlling the flow of water to said first coil and said second coil.

6. The system of claim 1, wherein said second temperature is greater than an air temperature of a space to be heated and said first temperature is less than said air temperature.

7. The system of claim 1, wherein said water-cooling means is a heat exchanger that accesses a ground water supply source.

8. The system of claim 1, wherein said water-cooling means has a watercooler outlet and a watercooler inlet, said watercooler outlet supplying water into said first piping system and said watercooler inlet receiving water from said first piping system, and further wherein said water-heating means has a heater outlet and a heater inlet, said heater outlet supplying water at said second temperature to said second piping system, said fluid inlet receiving water from said second piping system.

9. The apparatus of claim 8, wherein said water at said first temperature is continuously circulated by a cold-water pump and said water at said second temperature is circulated through said hot-water supply system by a hot-water pump.

10. The system of claim 1, wherein said first piping system carries fluid used exclusively for fire suppression purposes and cooling said building, further wherein said second piping system carries water used exclusively for domestic hot water purposes and heating said building.

11. The system of claim 1, wherein said second piping system and said fan coil assemblies provides substantially all of the heating requirements of said building.

12. A system for heating and cooling a building comprising:

water-cooling means for providing water at a first temperature, said water-cooling means having a cooler outlet and a cooler inlet;

a first piping network for carrying said water at said first temperature, said first piping network receiving said water via said cooler outlet and returning said water to said water-cooling means via said cooler inlet, said first piping network further having a plurality of release valves for releasing water, said first piping network being utilized as a fire sprinkler piping system for said building;

a second piping network for carrying water at a second temperature;

domestic water-heating means for providing water at a second temperature to a second piping system and for exclusively maintaining water in said second piping system at said second temperature, said water-heating means having a heater outlet and a heater inlet, said second piping network receiving said water via said heater outlet and returning said water to said water-heating means via said heater inlet, said second piping network further being utilized for supplying domestic hot water to said building; and a plurality of fan-coil assemblies located throughout the building, said fan-coil assemblies able to access said water at said first temperature from said first piping network and also able to access said water at said second temperature from said second piping network, wherein each of said fan-coil assemblies comprises air-circulating means and a first coil, said fan-coil assembly circulating air about said first coil, thereby transferring heat from the water in said first coil to the air if said first coil is accessing said water at said second temperature, or transferring heat from the air to the water in said first coil if said first coil is accessing said water at said first temperature.

13. The system of claim 12, wherein said fan coil assemblies include a first tubing network for carrying said water at said first temperature, a second tubing network for carrying said water at said second temperature, and a set of radiating fins, whereby both said first tubing network and said second tubing network are connected to said set of radiating fins such that thermal transfer may occur.

14. The system of claim 13, wherein said fan-coil assemblies further include valve means for controlling the flow of water to said first tubing network and said second tubing network.

15. The system of claim 12, wherein said fan-coil assemblies further include a second coil, wherein said second coil can exclusively access said water at said second temperature may and said first coil can exclusively access said water at said first temperature.

16. The system of claim 15, wherein said fan-coil assemblies further include valve means for controlling the flow of water to said first coil and said second coil.

17. The system of claim 12, wherein said second temperature is greater than an air temperature of a space to be heated and said first temperature is less than said air temperature.

18. The system of claim 12, wherein said water-cooling means is a heat exchanger that accesses a ground water supply source.

19. The system of claim 12, wherein said water-cooling means has a watercooler outlet and a watercooler inlet, said watercooler outlet supplying water into said first piping system and said watercooler inlet receiving water from said first piping system, and further wherein said water-heating means has a heater outlet and a heater inlet, said heater outlet supplying water at said second temperature to said second piping system, said fluid inlet receiving water from said second piping system.

20. The apparatus of claim 19, wherein said water at said first temperature is continuously circulated by a cold-water pump and said water at said second temperature is circulated through said hot-water supply system by a hot-water pump.

21. The system of claim 12, wherein said first piping network carries fluid used exclusively for fire suppression purposes and cooling said building, further wherein said second piping network carries water used exclusively for domestic hot water purposes and heating said building.

22. The system of claim 12, wherein said second piping network and said fan coil assemblies provides substantially all of the heating requirements of said building.

* * * * *